United States Patent [19]

Urioste et al.

[11] 4,035,473
[45] July 12, 1977

[54] METHOD OF REMOVING ACETYLENE FROM ANHYDROUS-HYDROGEN CHLORIDE

[75] Inventors: German R. Urioste; David E. Busby, both of Lake Jackson; Garnet E. McConchie, Clute; Jimmy D. Orr, Freeport, all of Tex.

[73] Assignee: The Dow Chemical Company, Midland, Mich.

[21] Appl. No.: 706,094

[22] Filed: July 16, 1976

Related U.S. Application Data

[63] Continuation-in-part of Ser. No. 592,971, July 3, 1975, abandoned.

[51] Int. Cl.² .................................... B01D 53/34
[52] U.S. Cl. ............................ 423/488; 423/245; 260/656 AC
[58] Field of Search .......... 423/240, 241, 245, 481, 423/488; 260/656 AC

[56] References Cited

U.S. PATENT DOCUMENTS 3,923,963  12/1975  Rideout et al. .................... 423/481

FOREIGN PATENT DOCUMENTS 1,405,714  9/1975  United Kingdom .............. 423/488

*Primary Examiner*—Earl C. Thomas
*Attorney, Agent, or Firm*—A. Cooper Ancona

[57] ABSTRACT

Small amounts of acetylene in anhydrous hydrogen chloride can be reduced by heating the gas to a temperature within the range of about 300° C to 500° C in the presence of oxygen, said oxygen being in molar excess to that of the acetylene present. The process converts up to 99+% of the acetylene to vinyl chloride, carbon monoxide, other oxidation and chlorinated products with minimal production of chlorine which is an undesirable by-product.

7 Claims, No Drawings

METHOD OF REMOVING ACETYLENE FROM ANHYDROUS-HYDROGEN CHLORIDE

CROSS REFERENCE TO RELATED APPLICATION

This application is a continuation-in-part of our co-pending application Ser. No. 592,971 filed July 3, 1975, now abandoned.

BACKGROUND OF THE INVENTION

Anhydrous hydrogen chloride is formed in the cracking of many chlorinated hydrocarbons. In the cracking of 1,2-dichloroethane (ethylene dichloride, EDC) to vinyl chloride some acetylene, up to about 0.6 mole percent of the hydrogen chloride, is also formed. Acetylene impurity in the HCl cannot be separated easily by known methods, such as distillation. Acetylene-free hydrogen chloride is directly applicable to many processes, in which acetylene is responsible for significant yield losses or unwanted impurity formations, e.g., oxychlorination of ethylene.

It is an object of this invention to reduce the quantity of acetylene in anhydrous HCl to a very low level.

It is another object of this invention to minimize the production of chlorine ($Cl_2$) from the oxidation of hydrogen chloride.

SUMMARY OF THE INVENTION

It has been found that if anhydrous hydrogen chloride containing small amounts of acetylene is mixed with oxygen or an oxygen-containing gas at high temperatures, the acetylene content is greatly reduced without the formation of large amounts of chlorine.

The acetylene content in the anhydrous hydrogen chloride produced in the cracking of EDC generally is present in a small amount of up to about 0.6 mole percent and the most frequent range is 0.15 to 0.3 mole percent. Even this amount is deleterious and must be reduced.

The oxygen can be supplied as pure or commercial grade oxygen, as air, or an enriched mixture of oxygen and air, or as a mixture of oxygen and an inert gas in the reaction e.g., the noble gases, or carbon dioxide. The most preferred form is commercial grade oxygen, air or an enriched mixture of oxygen and air.

The oxygen and hydrogen chloride can be fed to the reactor at ambient temperature and heated to reaction temperature, or one or both components of the mixture can be preheated before mixing and feeding to the reactor. When using pure oxygen, the preferred procedure is to preheat hydrogen chloride to reaction temperature and admix ambient temperature oxygen therewith prior to introducing the mixture into the reactor.

The operating temperature range is 300° C to 500° C and most preferred range is 340° C to 375° C. The temperatures below about 300° C provide too low a conversion to be practical, while those above about 500° C cause inordinate amounts of corrosion in metals normally used in such reactors and excessive oxidation of the HCl produces undesirable levels of chlorine.

The operating $O_2$/HCl mole ratio is 0.003 to 0.10 and the most preferred range is 0.01 to 0.04; this provides a molar excess of oxygen based on the acetylene present (i.e., up to 0.6 mole percent acetylene). Any more than a slight excess of oxygen should be avoided so the oxidation of hydrogen chloride to chlorine is minimized.

The operating reaction time is about 0.05 to about 5.0 seconds and the most preferred range is 0.5 to 1.6 seconds.

The reaction should be carried out in equipment which is resistant to oxidation and to the corrosive effects of hot HCl and small amounts of $Cl_2$. Thus, the reactor can be ceramic or ceramic-lined or it can be made of a corrosion resisting metal, e.g., nickel or alloys thereof, representative of which are those containing 14–25% chromium, 0–8% iron and the remainder nickel.

Since the reactor must be made of corrosion resistant materials which are expensive, it is preferred to employ high pressures which makes possible a smaller, and therefore, less expensive, reactor. Any pressure within practical limits is satisfactory, but a pressure within the range of from about 30 to about 110 psig (2.0 to 7.5 atm) is preferred.

The principal product is that from the reaction between HCl and acetylene, i.e., vinyl chloride. Minor amounts of carbon monoxide and organic chlorination and oxidation products of acetylene are also formed. Only small amounts of chlorine (<1000 ppm mole basis) are formed from oxidation of HCl. Acetylene content is reduced by up to 99+%, making it possible to feed the reactor effluent directly to an oxychlorination process.

Thus the method of the present invention reduces the acetylene content of anhydrous hydrogen chloride by heating said hydrogen chloride in the presence of a molar excess of oxygen, based on acetylene, to a temperature of at least about 300° C. for a contact time sufficient to convert the acetylene to chlorinated derivatives, primarily vinyl chloride.

DETAILED DISCLOSURE OF THE INVENTION

The examples which follow are intended to illustrate, but not to limit, the invention. All parts and percentages are on a mole basis, unless specifically designated otherwise.

EXAMPLE 1

The reactor was constructed of an Inconel 600 (an iron-chromium-nickel alloy manufactured by International Nickel Co.) tube, ¼-inch (0.64 cm) diameter by 13 ft (3.96 m) in length. The tube was heated by electrical resistance wiring.

A mixture of 1.25 grams moles/min. of anhydrous hydrogen chloride containing 0.17% acetylene and 0.25 gram moles/min. of air, providing a mole ratio of $O_2$/HCl of 0.042, was fed to the reactor at 50 psig (4.4 atm.) pressure and ambient temperature (25° C.). The mixture was heated to 450° C and maintained for a contact time of 0.8 second. The effluent gas contained 0.0002% acetylene.

EXAMPLE 2

The reactor described in Example 1 was used. A mixture of 11.45 lbs. (5.19 kg; 142.4 g moles/hr.) of anhydrous hydrogen chloride containing 0.22% acetylene and 0.37 pounds/hr. (0.168 kg/hr.; 5.25 g moles/hr.) of commercial grade oxygen was fed to the reactor at 88 psig (6.98 atm.) pressure and ambient temperature (250° C), providing a mole ratio of $O_2$/HCl of 0.037. The temperature of the reaction was 450° C and the reaction time 0.105 seconds. The effluent from the reactor contained 0.0026% acetylene and less than 150 ppm chlorine.

EXAMPLE 3

The reactor unit was constructed of an Inconel 600 tube, 1½ inch (3.81 cm) diameter by 22 ft. (6.7 m) in length. The first 16 ft. (4.9 m) of the reactor unit was used for preheating hydrogen chloride to reaction temperature, pure oxygen at ambient temperature being introduced at the end of the preheater section. The preheater section was heated with electrical resistance wiring with temperature control based on that of the reactor outlet gas.

Anhydrous hydrogen chloride containing 0.22% acetylene, 0.0009% vinvyl chloride, and 0.00% carbon monoxide was fed to the unit at a rate of 139.7 lbs/hr. (63.37 kg/hr.) with 2.48 lbs./hr. (1.12 kg/hr.) of pure oxygen being added to the reactor section. The $O_2/HCl$ mole ratio was 0.020 with a reactor contact time of 0.6 second. Reactor pressure was maintained at 70 psig (5.76 atm.) at a reaction temperature of 350° C. The effluent gas contained 0.016% acetylene, 0.176% vinyl chloride, and 0.032% carbon monoxide. Chlorine content was less than 150 ppm.

EXAMPLE 4

In this experiment the reactor used measured one inch (2.54 cm) in diameter and 18 inches (45.7 cm) long and was made of Inconel 600 pipe. The reactor was filled completely with high surface area (200 m²/g) alumina spheres (6–8 mm diameter). To avoid heat losses the reactor was electrically heated.

Anhydrous hydrogen chloride (HCl) containing 0.204% acetylene was fed to the reactor at the rate of 149 g moles/hr., the HCl having been preheated to the reactor temperature of 400° C prior to introducing oxygen at ambient (25° C) temperature into the gas stream at the entrance to the reactor. The oxygen was fed at the rate of 7.2 g moles/hr., providing a mole ratio of $O_2/HCl$ of 0.048. A pressure of 72 psig (5.9 atm.) and a reaction contact time of 0.65 seconds was maintained. Effluent gas from the reactor contained 110 ppm acetylene and 90 ppm chlorine.

An experiment useing the same reactor and reaction conditions but without the presence of the alumina spheres gave substantially the same results. Thus, the alumina apparently provided no catalytic effect on the reaction.

EXAMPLES 5–10

The following experiments were conducted using reactor configurations as described in previous examples. Table I shows the reactor types, hydrogen chloride flow rates, $O_2/HCl$ mole ratios, temperatures, pressures, and contact times. Results obtained in each reactor at the indicated operating conditions are shown by inlet and exit acetylene compositions. The amount of chlorine (undesirable) formed is also shown.

TABLE I

| Example Number | Reactor Type | HCl Flow g mole/hr. | $O_2$HCl Mole Ratio | Temp. °C | Pressure atm. | Contact Time, sec. | Acetylene ppm in | Acetylene ppm out | Chlorine ppm out |
|---|---|---|---|---|---|---|---|---|---|
| 5 | A | 208 | .084 | 448 | 7.8 | .66 | 1850 | 10 | n.a. |
| 6 | A | 101 | .082 | 450 | 3.7 | .63 | 1070 | 10 | n.a. |
| 7 | B | 23.5 | .037 | 470 | 6.7 | .075 | 2150 | 50 | 145 |
| 8 | D | 46.3 | .044 | 405 | 5.9 | 2.2 | 1510 | 10 | 80 |
| 9 | C | 1680 | .003 | 350 | 5.8 | .60 | 2080 | 10 | 110 |
| 10 | C | 1680. | .005 | 300 | 5.8 | .60 | 1960 | 900 | 370 |

Reactor Type A is the reactor described in Example 1 using Air
Reactor Type B is the reactor described in Example 2 using Oxygen
Reactor Type C is the reactor described in Example 3 using Oxygen
Reactor Type D is the reactor described in Example 4 using Oxygen and Alumina Spheres

EXAMPLES 11–16

The following table shows the conditions and results of runs conducted in plant reactors. The hydrogen chloride was passed through a coil (Inconel 600) in a direct fired furnace which heated it to the appropriate temperature. A commercial grade of oxygen at ambient temperature was introduced into the flowing stream of anhydrous hydrogen chloride after it had been heated.

The rate of flow of anhydrous hydrogen chloride was 50,000 lbs/hr. at a pressure of 60 psig (4.1 atm.). Contact time was approximately 1 second. After the process of treating with oxygen was completed the anhydrous hydrogen chloride was cooled by passing through a heat exchanger prior to use in an oxychlorination process. Table II shows the analyses for the various impurities found in the hydrogen chloride both before and after treatment.

TABLE II

| Temp. °C | $O_2/HCl$ Mole Ratio | HCl Analysis, in/out, mole ppm | | | | | | |
|---|---|---|---|---|---|---|---|---|
| | | CO | $CO_2$ | $C_2H_4$ | $C_2H_2$ | $C_2H_3Cl$ | $\alpha$-Di* | $Cl_2$ |
| 315 | .0114 | 0/400 | 0/100 | 300/300 | 2840/1300 | 15/455 | 0/810 | 0/20 |
| 332 | .0110 | 0/750 | 20/50 | 50/0 | 2830/410 | 15/1100 | 0/740 | 0/20 |
| 332 | .0110 | 0/800 | 40/40 | 135/50 | 3000/250 | 15/1810 | 0/510 | 0/100 |
| 362 | .0150 | 0/1000 | 0/0 | 60/0 | 2670/0 | 15/2060 | 0/420 | 0/50 |
| 342 | .0150 | 0/1300 | 0/40 | 60/0 | 2670/0 | 15/1690 | 0/550 | 0/10 |
| 345 | .0178 | 0/1300 | 0/120 | 60/30 | 2600/0 | 15/1560 | 0/380 | 0/24 |

*$\alpha$-di = 1,1dichloroethane

We claim:

1. A method for reducing the acetylene content of anhydrous hydrogen chloride containing trace amounts of acetylene which comprises heating to a temperature of about 300° C to about 500° C said anhydrous hydrogen chloride in the presence of oxygen for a contact time of from about 0.05 to about 5.0 seconds to convert said acetylene to chlorinated derivatives thereof, said oxygen being present in a molar excess based on the acetylene.

2. The method of claim 1 in which the acetylene in the hydrogenchloride is present in an amount up to about 0.6 mole percent.

3. The method of claim 1 in which the temperature is maintained within the range of from about 340° C to about 375° C.

4. The method of claim 3 in which the contact time is from 0.5 to 1.6 seconds.

5. The method of claim 1 in which the reaction is conducted under pressure.

6. The method of claim 5 in which the pressure is from about 30 to about 110 psig.

7. A method for reducing trace amounts of acetylene in anhydrous hydrogen chloride which comprises heating said HCl in the presence of from about 0.003 to about 0.10 moles of oxygen per mole of HCl at a temperature of from about 300° C to about 500° C for a contact time of from about 0.05 to about 5.0 seconds to convert said acetylene to chlorinated derivatives thereof.

* * * * *